2,874,084

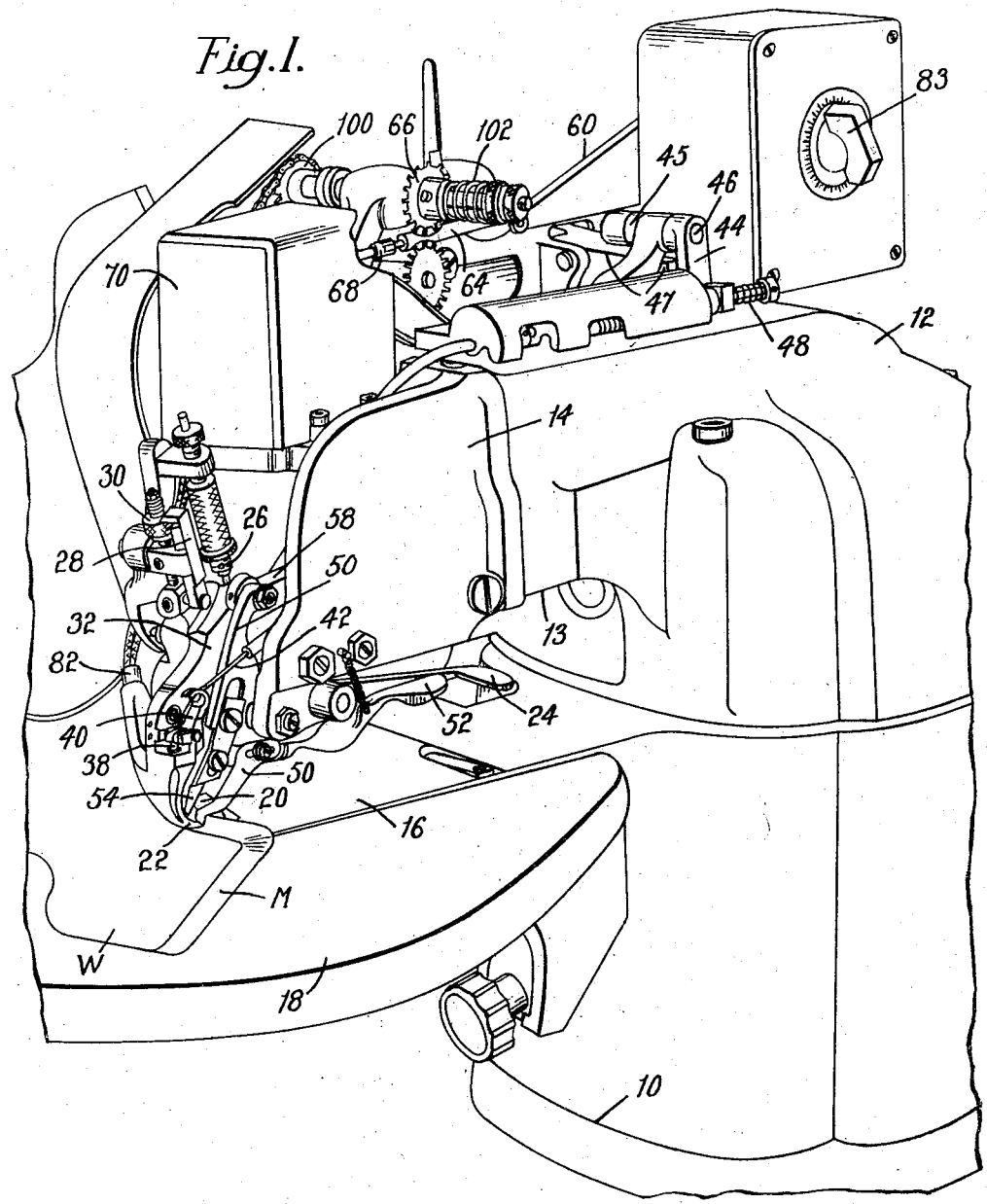

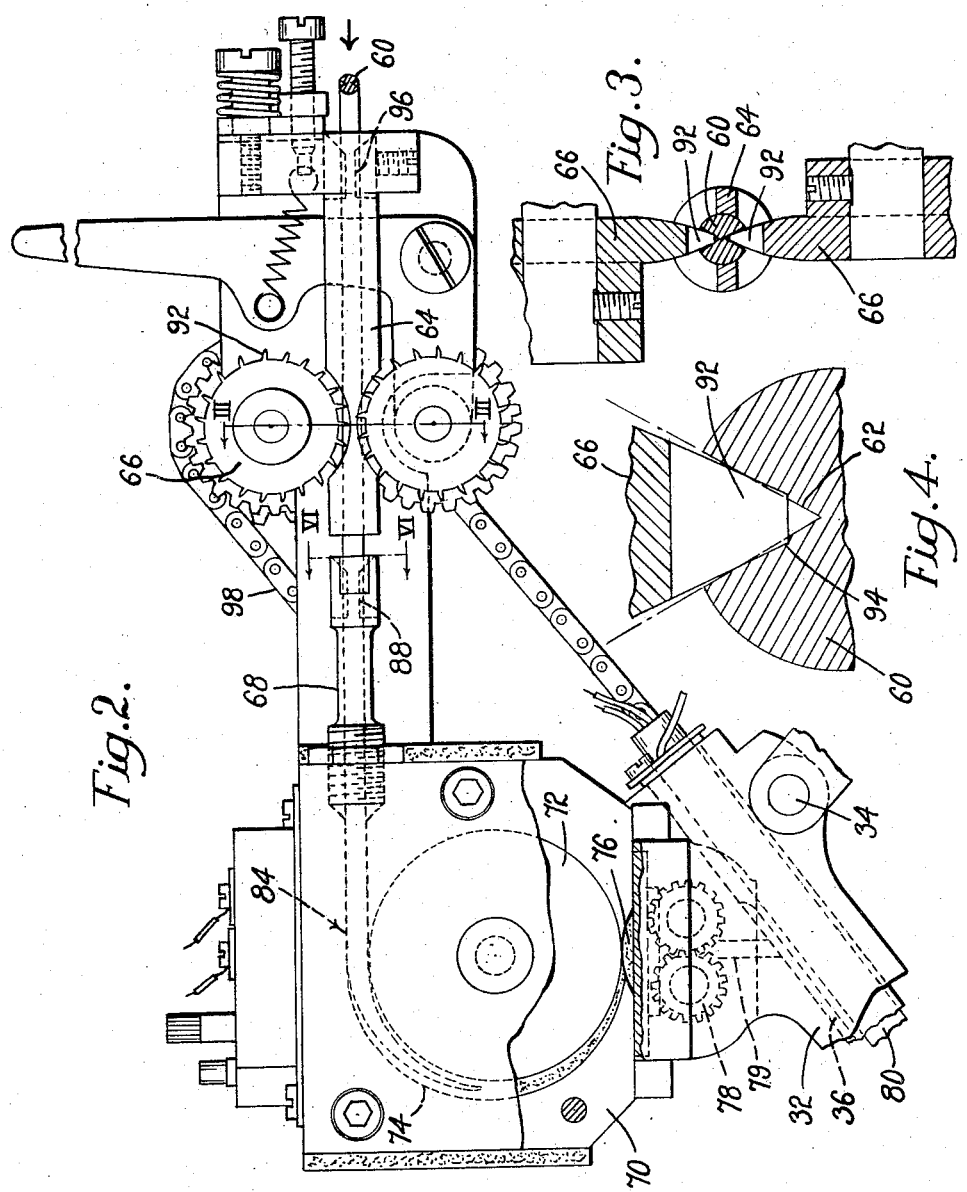

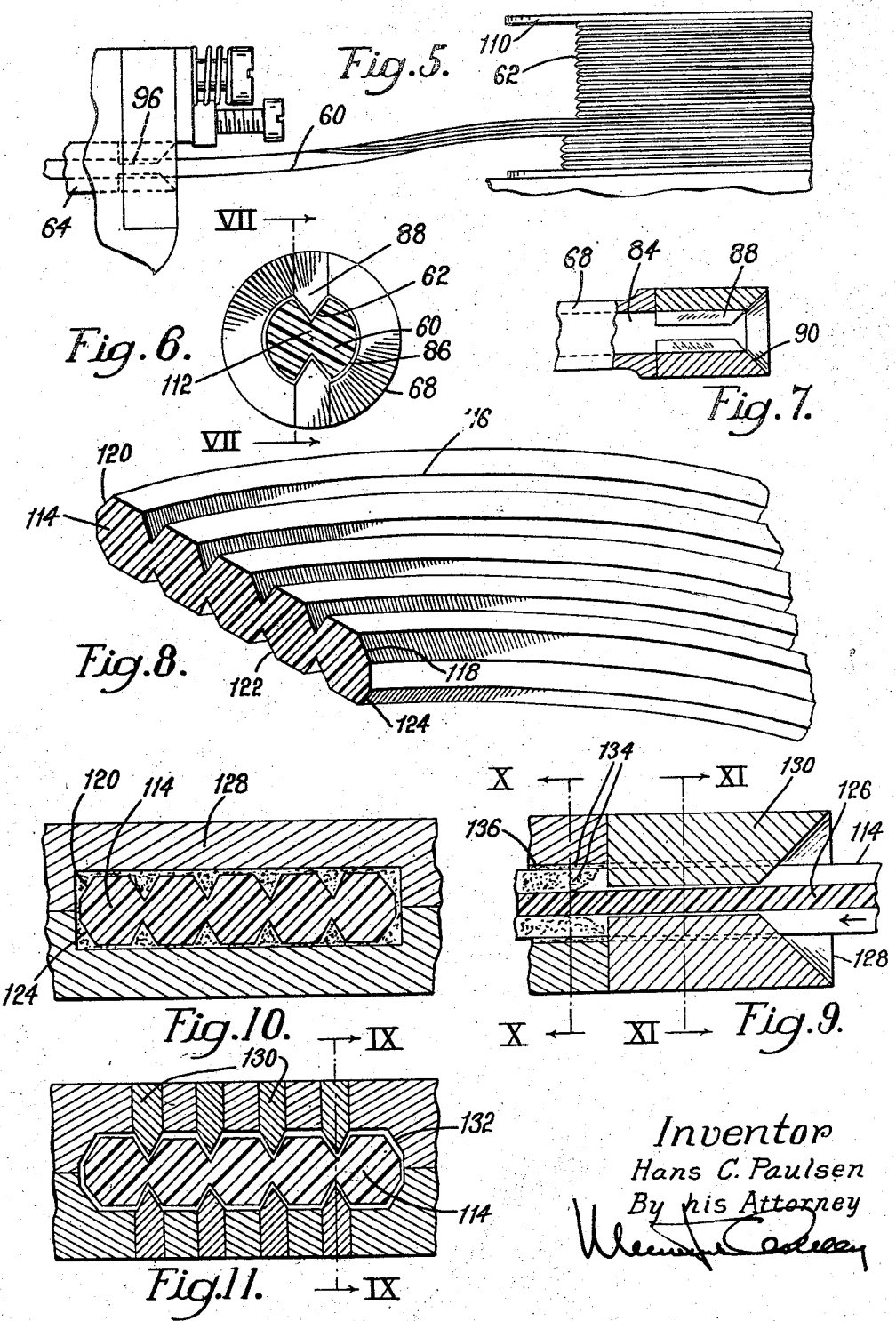

Patented Feb. 17, 1959

2,874,084

HANDLING THERMO-RESPONSIVE CEMENTS

Hans C. Paulsen, Medford, Mass., assignor to B. B. Chemical Co., Boston, Mass., a corporation of Massachusetts Application November 30, 1953, Serial No. 395,071

4 Claims. (Cl. 154—53.6)

This invention relates to improvements in the art of handling thermoresponsive cements which are normally in solid condition but are adapted to be melted for application to the work upon which they are to be used.

In Letters Patent of the United States No. 2,765,768, granted October 9, 1956, filed January 6, 1953, I have disclosed apparatus which greatly facilitates the handling and application to a work piece of thermoresponsive cement supplied in the form of a solid, flexible rod of substantially circular cross section to provide a package or reservoir of solid thermoplastic adhesive of the novel type disclosed and claimed in a copending application for United States Letters Patent Serial No. 377,162, filed August 28, 1953 in the names of Thomas C. Morris and Eric C. Johnson, and the present invention provides important improvements in the form of the cement rod and in apparatus for melting and feeding the cement, novel features of which are claimed in a copending application Serial No. 700,895, filed on December 5, 1957, as a division of the present application.

In any through feed machine for feeding, melting and applying rod cement there must be an entrance opening into which the solid, cold rod is delivered and an outlet opening from which the melted cement is delivered for application to the work. For the cold rod to move freely into the heated machine the entrance opening must be large enough to allow free movement but must fit closely enough to resist leakage of melted cement around the rod if the rod should be delivered to the machine faster than it is removed from the outlet opening, or if the machine is left idle for an interval, as it may be when there is an interruption in the supply of work. Most of the compositions suitable for such cements expand in volume when they are melted and with machines as heretofore constructed a back pressure is developed within the machine which tends to force out a mass of melted cement at the entrance opening, which mass is hardened by the surrounding air, frequently in the form of a doughnut surrounding the rod, and must eventually be cleared away. Such prior machines have been satisfactory when the rate at which adhesive was required was fairly uniform, because a minimum quantity of adhesive was at a high temperature at any given time and melted portions in the passageway were carried forward in orderly fashion, minimizing the likelihood of heating any portion of the adhesive material too long, with possible harmful effects. However, when a large volume of melted cement may be required occasionally, or when an adhesive having a high melting temperature is used, it has been necessary to raise the temperature in the dispensing passageway of the machine to an undesirably high point in order to secure the necessary melting rate.

The object of the present invention is so to improve the form of the cement rod that these and similar difficulties will be eliminated.

In one aspect of the invention the difficulties are mitigated by providing a strand or rod having a particular physical cross section usable in a direct through-feed cement dispensing system and capable of being reduced to molten condition in a shorter time or at a lower temperature than has heretofore been found necessary. It will be understood that rods of thermoresponsive cement including bars, cords and strips or the like are made as elongated bodies of solid, volatile-solvent-free, usually thermoplastic materials. Conveniently, such rods will have substantially the same cross section throughout their lengths and usually the surface will be smooth but it is within the scope of the invention to provide small projections or depressions such as small notches or teeth for cooperation with a feeding mechanism.

The cross-sectional contour of such rods will be such that the ratio of surface area to volume is high thereby facilitating the transfer of heat and fast melting of the adhesive, while retaining sufficient stiffness to perform the control and feeding functions required in a direct through-feed cement dispensing system. The rod will advantageously be provided with opposed longitudinally extending grooves to facilitate coiling the rod and to expose increased surface area for rapid melting. It has been found that a minimum thickness of about one-eighth of an inch is desirable and that the cross-sectional shape of the rod should be so designed that no portion of the adhesive is more than one-quarter of an inch from a surface of the rod. Within these limits many useful shapes may be devised.

For example, the body of the rod may have only one longitudinally extending V-groove so as substantially to increase the surface area exposed to the heating device.

An added advantage resulting from such grooving lies in the ability of the sides of the groove to drag along the molten cement wtih a pull greater than the resistance offered to the moving cement by the portion of a wall within a casing overlying or subtending a groove. This action occurs partly because the area of the surface within the groove is greater than the area of the subtending portion, when the inside angle is less than 120°, and partly because a grooved rod tends to drag along the viscous material which is only partly melted but which slides on the hotter surface of the casing.

As is explained in the above-mentioned divisional application, one feature of the novel apparatus for melting and feeding the cement resides in the provision of groove-entering splines which extend longitudinally of the entrance passageway at the beginning thereof to fill the grooves, thus minimizing the back-pressure leakage at this point even when the rod is standing still. As the passageway extends beyond these splines, a portion of its length may be made with a slightly larger diameter than the maximum diameter of the rod, the grooving of the solid rod providing an empty space which can be filled with the molten cement as the material expands. Therefore, in order to take full advantage of this benefit, the grooving of the improved rod is so designed as to provide a space per unit length within the confines of the outer periphery of the cement which corresponds approximately to the volumetric expansion thereof per unit length when melted.

These and other features of the invention will best be understood from a consideration of the following specification taken in connection with the accompanying drawings, in which:

Fig. 1 is an angular view of a folding machine embodying a novel mechanism for handling a rod type of cement having a particular physical contour;

Fig. 2 is a side elevation of a feeding and melting mechanism for handling one form of a cement of this type;

Fig. 3 is an enlarged fragmentary section through feed rolls for the rod and the material on the line III—III of Fig. 2;

Fig. 4 is a still further enlarged section through a portion of the rod material, showing one tooth of a feed wheel;

Fig. 5 shows in elevation a coiled rod of the opposed-groove type and the entering portion of a guideway therefor;

Fig. 6 is a section, greatly enlarged, on the line VI—VI of Fig. 2 to show the contour and cross section of the cement together with that of the entrance gland where the rod of material is received in the heating device;

Fig. 7 is a longitudinal section through part of this gland taken on the line VII—VII of Fig. 6;

Fig. 8 shows a modified rod having grooving in the form of a plurality of V-shaped grooves upon opposite sides of a flattened strip;

Fig. 9 is a longitudinal vertical section through a portion of an entrance gland showing two of the splines fitting the grooves and this section is taken on line IX—IX of Fig. 11;

Fig. 10 is a vertical section on the line X—X of Fig. 9 showing the rod in the entrance gland after it has passed the splines; and Fig. 11 is a similar section taken through the splined portion of the entrance gland on the line XI—XI of Fig. 9.

Although cement derived from a melted rod, such as that which forms the subject-matter of the invention, may be applied to pieces of work by machines of radically different construction and purpose, it is found convenient to illustrate herein a machine for folding the margins of work pieces such as leather shoe-upper parts in which the novel rod may be employed. This machine is of the type illustrated in my prior patent mentioned above. It comprises a base 10 on which there is mounted a top 12 having an overhanging arm 13 which supports an end cap 14. A lower arm 16 of the machine is provided with a work table 18 on which is supported a piece of work W, such as a pair of shoe quarters joined at the back seam and provided with a skived margin M.

The folding of this margin is carried out in the usual fashion by means of a folding finger 20 which cooperates with a creaser foot 22. The creaser foot and a number of other parts of the machine which overlie the work are mounted in the head 14 and, as was true in the machine of my prior patent, the creaser foot is tiltable, to facilitate the admission of a piece of work, by means of a finger piece 24. It is held yieldably against the work by a spring inside of a sleeve 26 and the limit of downward movement of the creaser foot is controlled by a dovetail slide 28 which is pivotally attached thereto and which has an overhanging top end engaging an adjustable graduated finger piece 30. A carrier arm 32 to which the creaser foot is attached is mounted on a pivot 34 (Fig. 2) within the head of the machine and is provided with a cement passage 36 terminating in an outlet opening (not shown) at the lower end of the creaser foot 22. Adjacent to the outlet there is a movable valve closing the outlet and having a stem 38 which is joined to a bell crank 40. The bell crank is adapted to be rotated to open the outlet by a Bowden cable 42 extending to a point on the top of the arm 12 where it is pulled to the right by a two-arm lever 44, 45 mounted on a spindle 46 arranged to be turned in a counterclockwise direction, as is viewed in Fig. 1, by a solenoid (not shown) pulling down the far end of a lever 47 and raising its near end beneath the arm 45. This solenoid is energized when an operator-controlled switch is closed every time the operator presents a new piece of work to the machine. A spring 48 provides a yielding connection between the lever 44 and the Bowden cable 42, thereby avoiding breakage in case the valve spindle 38 is stuck because the operator has not applied heat for a sufficient length of time before starting the machine.

The end cap 14 also provides a support for a gage finger 50 having a finger lever 52, as well as for a snipping knife 54 attached to a pivoted lever 56 which may be oscillated by power supplied to a rod 58, as is common in machines of this type.

A rod 60 of thermoplastic cement has a special cross-sectional contour the purpose of which will appear during the further discussion of the handling mechanism. In the particular form illustrated in Figs. 2, 3 and 4, it is provided with opposed re-entrant grooves 62 the walls of which diverge at an angle of approximately 60°. It will be noted that the apices of the opposed grooves are separated (Fig. 3) by a sufficient distance to leave a central core having ample strength to permit the handling and feeding of the rod material.

In the illustrated machine, the rod is supplied to the handling mechanism of Fig. 2 from a reel 110 (Fig. 5) and passes from that reel to a guide tube 64 cut away to permit the engagement of the rod with coacting feed wheels 66 which pass the rod along through an entrance gland 68 to a heated casing 70. A space is provided between the guide tube 64 and the gland 68 so that heat is not transferred by conduction from the latter to the guide tube.

In this casing 70, there is a driven disk 72 partly surrounded by a passage 74 extending from the entrance gland 68 to an outlet 76 where the melted cement is received by a pump 78 and forced through a pump outlet 79 and thence through the passage 36 in the carrier 32 for the creaser foot 22. Within the passage 36 there is a heating unit 80 to maintain the molten condition and other heating units (not shown) are provided for heating the casing 70 and hence the disk 72, as well as a unit 82 (Fig. 1) attached to the side of the creaser foot 22. A control rheostat 83 is connected to the unit 82 to control the heat in the creaser foot.

An initial portion 84 of the passage 74 is cylindrical and is slightly larger than the diameter of the cold rod so as to permit the free running of the rod through this portion as it expands in volume. On the other hand, the passage 74, from a point at the top of the disk to a point at the bottom thereof adjacent to the outlet opening 76, is rectangular and is gradually tapered and extends around the periphery of the disk so that the latter is in contact with the cement along about half of its periphery. This disk, as explained in my prior patent, is of major assistance in delivering sufficient heat to melt the material since it picks up heat from the casing as any point on its periphery rises and gives it up to the cement as that point rubs against the cement. The disk also actively assists in frictionally carrying the material along through the passage as the material gradually melts.

Due to the tapering portion of the passage 74, which is made as wide as is the disk and is normally rectangular in cross section, and partly because machines of this type are intermittently operated, there is created a back pressure which is particularly noticeable during periods between the times of delivery of cement to successive pieces of work. During the times when the machine is temporarily shut down, there is a tendency for the back pressure within the casing 70 to cause the molten cement to ooze out around the rod at the entrance of the casing and to form a doughnut-like blob at the outer end of the gland 68. Under certain conditions, this blob of material may remelt and be drawn into the gland by the ingoing rod, but, in general, it will grow larger and need to be removed. On the other hand, the passage for the introduction of cold cement may not be made to fit too tightly against it because of the need for easy entrance of the rod during the operation of the machine and because of the necessity for providing for the expansion of the material as it is heating. In practice, the apparently large space 86 (Fig. 6) around the rod in the entrance gland 68 is not appreciable and for the 3/16" rod is a space of 1/64". Furthermore, any passage of the molten cement back along the grooves 62 is substantially prevented by the provision of tapered splines 88 (Figs. 2, 6 and 7) which enter and substantially fit said grooves. It will be noted that the entrance end 90 of the gland 68 is counterbored and the ends of the splines are cut away at the same angle to facilitate the entrance of a fresh piece of cement.

The entrance gland 68 is provided with thin walls and extends out from the casing 70 a substantial distance so that it will be air cooled and prevent the heat of the casing from being conducted far enough along the tube to cause the rod to stick to it when the machine is started up after an interval of disuse.

In the feeding of the rod, the cooperating feed wheels 66, the periphery of each of which is tapered as shown in Fig. 3, wedge themselves into the groove to an extent which prevents any slipping of the feed wheels on the rod. Preferably, and as illustrated in Fig. 4, the taper of the peripheries of the feed wheels is slightly less than that of the grooves in the rod and the teeth 92 thereon are decapitated or squared to prevent them from bottoming in the groove. As a result the corners of the teeth cut into the sides of the grooves as indicated in Fig. 4 at 94 and obtain a positive bite. At the entrance of the guide tube 64 are splines 96 which are shaped similarly to the splines 88 in the gland 68. They are, however, for an entirely different purpose and serve to aline the grooves of the rod with the peripheries of the feed wheels as the rod comes to the handling apparatus from a storage reel 110 (Fig. 5) or the like.

The pump 78 is power driven as in the earlier machine and a chain 98 and a cooperating sprocket 100 (Fig. 1) are used to drive the feed wheels 66. A slip clutch or impositive drive is provided, as in the earlier machine, to avoid any breakage of parts in case the operator tries to start the machine before the cement is melted.

The rod of cement, which forms the subject-matter of the invention, is composed of thermoresponsive cement of solid volatile-solvent-free materials made into an elongated body which has, throughout its length, substantially the same gross cross section (as defined by a perimeter bridging the groove). Such rods are usually thermoplastic materials which are solid at room temperatures but which may be melted for application to the work, usually by the use of rather high temperatures such as 300° F. or higher. Conveniently, such a rod 60 may be formed into a coil or the like, mounted upon a suitable reel 110 (Fig. 5) and the coiling is facilitated by the provision of the opposed re-entrant grooves 62 because of the added flexibility imparted to the rod. At the same time there is enough separation at 112 (Fig. 6) between the bottoms of the grooves so that there is ample strength to permit the handling and feeding of the rod. When used in folding machines the quantity desired for application to the work may be readily provided by a rod having a diameter of 3/16" and such a rod is shown at about twice its normal size in Fig. 3 and about twelve times its normal size in Fig. 4. In the handling apparatus the grooves 62 are filled by the entering splines 88 forming a part of the entrance gland 68. The rod is guided to the entrance tube in proper position by reason of the additional splines 96, supported by the guide tube 64, prior to their passage through the feed rolls 66.

After the rod has passed the splines 88 of the entrance gland of the heated casing 70, it is received in a space 84 (Fig. 2) which is as large as or slightly larger than the largest diameter of an ungrooved rod of the same size. There, the rod greatly facilitates the proper operation of the heating device because the grooving furnishes a space into which the expanded and melted cement may flow, and provides a high ratio of surface area to volume, per unit of length. By reason of the fact that the volume per unit length of these two grooves corresponds approximately to the volumetric expansion per unit length of the rod material when melted, the expanded and melted cement will be received by the grooving and this action will, to a large extent, overcome the tendency for it to work out of the entrance opening by reason of back pressure.

Furthermore, the adhesion between the melted cement and the sides of the grooves in the rod is much greater than the adhesion between the cement and the opposed subtended or underlying portions of the walls of the passage 84 partly because the area of said sides of the groove is nearly twice as great as that of the wall section in question, which also, by reason of the fact that it is hotter than the rod, tends to melt any adjacent portions and make them "slippery." Probably, too, the angular groove drags the cement away from the entrance, providing fresh space for expansion. The grooved rod also gives added help in pushing along the molten cement so as to keep it moving toward the outlet and prevent any one portion from being exposed for any considerable period to the temperature of the heated casing. Those portions of the surface of passage 84 which lie opposite to the grooves may also be considered to correspond to the removed periphery of the rod which follows the formation of the groove.

It will be understood that although the grooved contour or cross sectional shape of the rod which is illustrated in Figs. 5 and 6 constitutes a simple and convenient arrangement, it is not the only contour which would accomplish substantially the same result and which may be desired under other conditions. For example, for the formation shown in Fig. 8, a rod 114 is flatter than that shown in Fig. 6 and is provided with grooving illustrated as comprising four V-shaped grooves 116 formed upon the upper surface together with a cutaway grooving 118 and 120 at the corners, while the bottom surface is similarly provided with inverted V-shaped grooves 122 and cutaway corners 124. The core 126 between the apices of the grooves furnishes strength enough for easy handling of the rod, while not interfering with the easy coiling of the rod or with the penetration of heat. I have found, for example, that it is not desirable to have any point in the rod more than 1/4" from the nearest outside surface and that the minimum total thickness of the rod should be 1/8". In the handling of such a rod, feed wheels will enter the grooving and may be multiple wheels of the type shown in Fig. 3. An entrance gland 128 may be made up of two halves each of which is provided with a series of splines 130 which fit the grooves of the top and bottom surfaces of the rod. These opposed grooves at the entrance end of the gland are also provided with surfaces 132 (Fig. 11) which coact with the corner grooves 118, 120 and 124 so that there is very little possibility of leakage when the molten cement 134, in the inner portion 136 of the entrance gland shown in Fig. 10, fills the grooving. The dimensions of the grooving are such, as in the other form of rod, that the volumetric expansion per unit length of the rod is substantially equal to the volume per unit length of the grooving. The action of the grooves in dragging along molten cement will be the same with this form as with the form shown in Fig. 6 since the area of the sides of the grooves will be substantially twice as great as the area of the subtending portions of the inner surface of the entrance gland.

In the operation of the machine, assuming that a coiled supply has been positioned thereon and the rod 60 has been fed into the guide tube 64, being oriented therein by the guide splines 96, and thence to the entrance gland 68, the heat will be turned on and the cement, if any, already in the machine will be thoroughly melted. The operator will then, by means of a suitable knee lever or treadle or the like, start the drive of the folding machine and the oscillatory drive for the handling apparatus. After this, the cementing of the margin M of a workpiece W and the immediate folding thereof will take place in the usual fashion.

A minimum quantity of material is heated at any time and only so much cement is delivered to the creaser foot 22 as is needed by the work. This quantity will always be maintained at the desired temperature so that it will flow freely from the outlet of the creaser foot nozzle.

The difficulties which have been previously found in the handling and melting apparatus will have been substantially overcome by reason of the special formation of the rod 60 and the arrangement of the cooperating parts of the handling apparatus. With the rod 114, the action will be substantially the same.

Having thus described my invention, what I claim as new and desire to secure by Letters Patent of the United States is:

1. A flexible rod of thermoplastic cement of indefinite length having longitudinally extending grooving to facilitate coiling of the rod and to expose increased surface area for rapid melting, the volume per unit length of the space within said grooving corresponding to the volumetric expansion per unit length of the grooved rod material when melted.

2. A rod of normally solid cement cafpable of being softened by heat, the composition of said material being such that its volume is increased by the application of heat to melt it, said rod having one or more V-shaped grooves extending lengthwise thereof to receive cooperating parts of a cement handling apparatus and to provide an increased surface area to facilitate the absorption of heat, the relation of the cross sectional area of said groove or grooves to the total sectional area of an ungrooved rod of similar transverse size corresponding substantially to the increase in volume of the grooved rod when melted.

3. A rod of normally solid, thermoresponsive, flexible cement, said rod having opposed V-shaped grooves the apices of which are spaced sufficiently to leave an intermediate portion having sufficient strength to permit the ready handling of the material, the total cross-sectional area of said grooves bearing such a relation to the normal cross-sectional area of an ungrooved rod of equal over-all external dimensions that it is of the same order as the increase in volume of the grooved rod when melted, and, the sides of said grooves having an area substantially greater than the area of the surface of the removed periphery.

4. A flexible rod of thermoplastic cement of indefinite length and generally circular cross section having a pair of diametrically opposed V-shaped grooves extending lengthwise of the rod adapted to receive cooperating parts of a cement handling apparatus, to facilitate coiling of the rod and to expose increased surface area for rapid melting, the apices of said grooves being spaced far enough apart to leave an intermediae portion of sufficient strength to permit ready handling of the rod and the sides of said grooves having an area, per unit length of the rod, which is substantially greater than the area of the surface of the removed periphery of the rod.

References Cited in the file of this patent

UNITED STATES PATENTS

| | | |
|---|---|---|
| 1,037,235 | Gibson, Sr. | Sept. 3, 1912 |
| 1,386,068 | Maynard | Aug. 2, 1921 |
| 1,400,078 | Kempton | Dec. 13, 1921 |
| 1,465,424 | Durgin | Aug. 21, 1923 |
| 2,319,225 | Grebe et al. | May 18, 1943 |
| 2,518,997 | Powers | Aug. 15, 1950 |
| 2,567,960 | Meyers et al. | Sept. 18, 1951 |
| 2,571,715 | Henning | Oct. 16, 1951 |
| 2,636,214 | Slusher | Apr. 28, 1953 |
| 2,708,278 | Kamborian | May 17, 1955 |